United States Patent
DiChiara et al.

(10) Patent No.: US 7,137,700 B2
(45) Date of Patent: Nov. 21, 2006

(54) IMPACT RESISTANT EYEWEAR FRAME ASSEMBLY HAVING A SPLIT FRAME AND FASTENER REINFORCEMENT

(75) Inventors: Carmine S. DiChiara, Warren, NJ (US); Peter S. Leonardi, Gloversville, NY (US)

(73) Assignees: Liberty Sport, Inc., Fairfield, NJ (US); Halo Sports and Safety, Inc., Gloversville, NY (US)

( * ) Notice: Subject to any disclaimer, the term of this patent is extended or adjusted under 35 U.S.C. 154(b) by 0 days.

(21) Appl. No.: 11/124,373

(22) Filed: May 9, 2005

(65) Prior Publication Data
US 2005/0280771 A1    Dec. 22, 2005

Related U.S. Application Data

(63) Continuation-in-part of application No. 10/391,796, filed on Mar. 20, 2003, now Pat. No. 6,890,073.

(51) Int. Cl.
*G02C 1/08* (2006.01)
(52) U.S. Cl. .............................. 351/90; 351/95; 351/99
(58) Field of Classification Search .......... 351/90–102, 351/140, 141
See application file for complete search history.

(56) References Cited

U.S. PATENT DOCUMENTS

| | | |
|---|---|---|
| 308,344 A | 11/1884 | Collins |
| 409,957 A | 4/1889 | Searing |
| 1,272,833 A | 7/1918 | Metcalf |
| 1,922,766 A | 8/1933 | Hurwitz |
| 2,551,144 A | 5/1951 | Lindemann et al. |
| 2,887,929 A | 5/1959 | Farmer |
| 3,155,982 A | 11/1964 | Baratelli |
| 3,394,980 A | 7/1968 | Dym |
| 3,510,208 A | 5/1970 | Watkins |
| 3,544,204 A | 12/1970 | Bienenfeld |

(Continued)

FOREIGN PATENT DOCUMENTS

DE    4239312    5/1994

(Continued)

OTHER PUBLICATIONS

Liberty Sport, Inc, Glazing Instructions for Rec Specs Maxx Eyewear, at least as early as Sep. 2003.

*Primary Examiner*—Huy Mai
(74) *Attorney, Agent, or Firm*—Roylance, Abrams, Berdo & Goodman, L.L.P.

(57) ABSTRACT

The present invention provides an eyewear frame assembly. A frame has an aperture for receiving a lens. The frame has a split to expand upper and lower portions of the frame to insert or remove the lens from the aperture. First and second projections extend outwardly from the upper and lower frame portions, respectively. The first and second projections have first and second tapered portions, respectively. A sleeve receives said first and second projections. The sleeve has first and second inwardly extending and tapered tabs adapted to receive the first and second tapered portions to secure the first and second projections within the sleeve. The upper and lower portions of the frame are prevented from expanding when the first and second projections are received within the sleeve. First and second openings in the sleeve provide access to depress the first and second projections to remove the first and second projections from the first and second sleeves. A threaded fastener and a threaded sleeve forms a reinforcement assembly for the two portions of the split frame. The sleeve engages the fastener to resist its disengagement with the bushing.

33 Claims, 8 Drawing Sheets

U.S. PATENT DOCUMENTS

| | | |
|---|---|---|
| 3,667,834 A | 6/1972 | Davison et al. |
| 3,759,608 A | 9/1973 | McVeigh |
| 3,762,804 A | 10/1973 | Livas |
| 3,801,189 A | 4/1974 | Bolle |
| 4,017,165 A | 4/1977 | Davis |
| 4,488,792 A | 12/1984 | Wagner |
| 4,670,915 A | 6/1987 | Evans |
| 4,792,221 A | 12/1988 | Parks et al. |
| 4,813,775 A | 3/1989 | Kaksonen |
| 4,832,478 A | 5/1989 | Salce |
| 4,978,209 A | 12/1990 | Ohba |
| 5,007,728 A | 4/1991 | Magorien |
| 5,289,592 A | 3/1994 | Paivarinta |
| 5,347,325 A | 9/1994 | Lei |
| 5,381,192 A | 1/1995 | Canavan et al. |
| 5,426,473 A | 6/1995 | Riehm |
| 5,500,694 A | 3/1996 | Roever et al. |
| 5,523,806 A | 6/1996 | Sakai |
| 5,528,320 A | 6/1996 | Specht et al. |
| 5,594,511 A | 1/1997 | Lin |
| 5,652,635 A | 7/1997 | Kirschner |
| 5,652,637 A | 7/1997 | Marini |
| 5,668,619 A | 9/1997 | Bolle |
| 5,682,221 A | 10/1997 | Dittmeier |
| 5,726,732 A | 3/1998 | Kobayashi |
| 5,847,801 A | 12/1998 | Masunaga |
| 5,862,529 A | 1/1999 | Moodie et al. |
| 5,936,701 A | 8/1999 | Sartor |
| 5,940,164 A | 8/1999 | Deppi |
| 6,099,118 A | 8/2000 | Hwang et al. |
| 6,145,985 A | 11/2000 | De Marchi et al. |
| 6,231,181 B1 | 5/2001 | Swab |
| 6,273,564 B1 | 8/2001 | Wedeck et al. |
| 6,276,796 B1 | 8/2001 | Lindberg et al. |
| 6,409,336 B1 | 6/2002 | Kuo |
| 6,454,406 B1 | 9/2002 | Guo |
| 6,890,073 B1 | 5/2005 | DiChiara et al. |

FOREIGN PATENT DOCUMENTS

| | | |
|---|---|---|
| EP | 0 079 577 | 5/1983 |
| EP | 1156358 | 11/2001 |
| FR | 8316218 | 4/1984 |
| GB | 322408 | 12/1929 |
| GB | 2034072 | 10/1979 |
| JP | 592096 | 4/1925 |
| JP | 8114772 | 5/1996 |
| JP | 833185 | 4/1998 |
| JP | 2093554 | 4/2000 |
| JP | 275583 | 10/2000 |

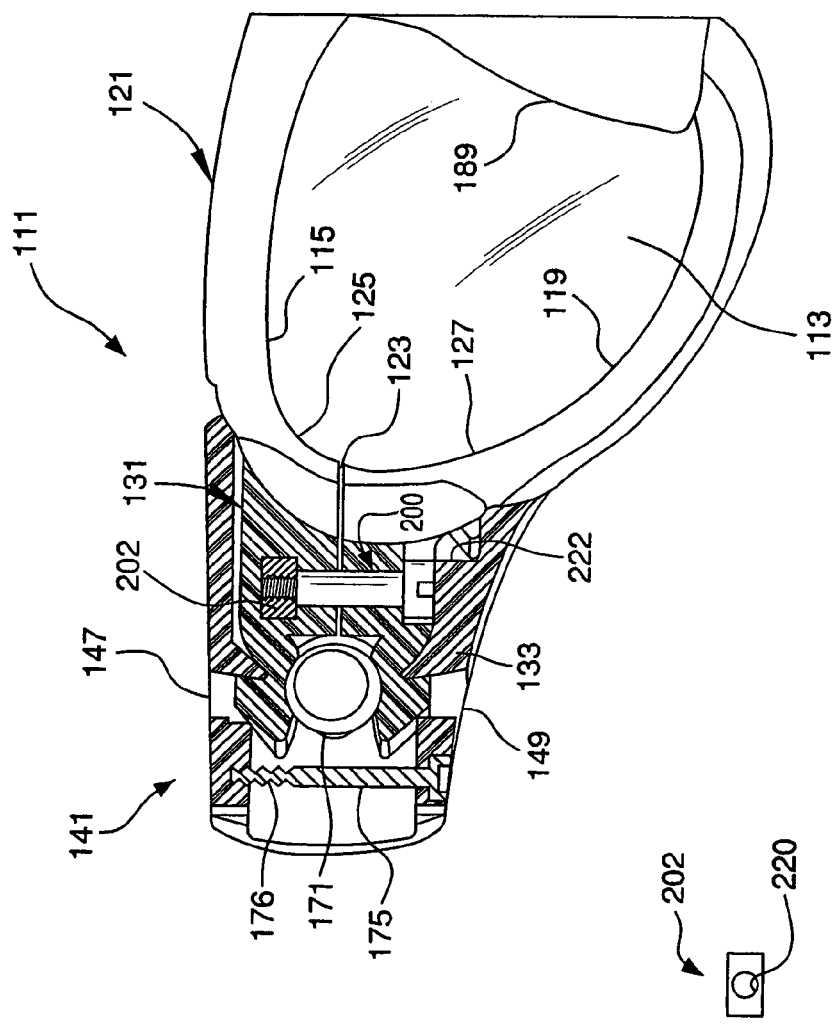
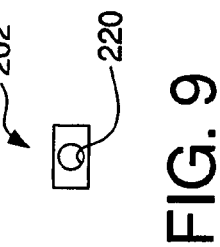
FIG. 8
FIG. 9

IMPACT RESISTANT EYEWEAR FRAME ASSEMBLY HAVING A SPLIT FRAME AND FASTENER REINFORCEMENT

RELATED APPLICATIONS

This application is a continuation-in-part of U.S. patent application Ser. No. 10/391,796 filed Mar. 20, 2003 now U.S. Pat. No. 6,890,073 for Impact Resistant Eyewear Frame Assembly Having a Split Frame, the disclosure of which is hereby incorporated herein by reference.

FIELD OF THE INVENTION

The present invention relates to an eyewear frame assembly that is impact resistant. More particularly, the present invention relates to an impact resistant eyewear frame assembly having a split frame for easily inserting and removing a lens. Still more particularly, the present invention relates to an impact resistant split frame having projections adapted to be received by a sleeve to secure a lens within the frame, as well as a threaded fastener and a threaded bushing received inside the sleeve to form a reinforcement assembly for two portions on the split frame.

BACKGROUND OF THE INVENTION

Eyewear frame assemblies often need to be impact resistant, such as when worn for sporting activities. ASTM F803 is a stringent standard governing impact resistance requirements for eyewear worn during sporting activities. Polycarbonate is the material of choice for eyewear frames meeting the ASTM F803 requirements. That is used for non Rx-able frames known as Plano frames, no prescription lenses. For prescription eyewear, there needs to be a way to insert the lenses and still maintain the impact strength of the material. Heating of the eyerim of a frame is the known norm for the insertion of lenses into plastic sport frames. Heating of most eyewear frame materials, such as polycarbonate, to insert lenses in the eyewear frames destroys the impact resistance strength of the frames. Some materials are extremely resistant to heat, thereby preventing heating as an option for inserting lenses in the eyewear frames. Still other materials require an excessively thick eyewear frame to meet the impact resistance requirements, so that the resulting eyewear frames are aesthetically undesirable, bulky and awkward for wearers. A need exists for eyewear frames that allow for insertion of lenses without affecting the impact resistance of the eyewear frames and still provide aesthetically pleasing and efficient eyewear frames.

Eyewear frames in which lenses can be easily inserted and still withstand impact are greatly desired by wearers. Heating frames to insert lenses and still maintain impact usually requires the frame to be bulky. Eyewear frames exist that allow the wearer to remove and insert lenses. However, most existing eyewear frames do not provide the impact resistance required by ASTM F803. Wearing such eyewear frames during a sporting activity could result in serious injury to wearers if the frames and lenses are not able to sustain impacts. A need exists for eyewear frames that allow for easy insertion and removal of lenses, while still meeting the impact resistance requirements for use during sporting activities.

Thus, there is a continuing need to provide improved eyewear frame assemblies.

SUMMARY OF THE INVENTION

Accordingly, it is a primary objective of the present invention to provide an improved eyewear frame assembly that is impact resistant and reinforced.

Another object of the present invention is to provide an aesthetically appealing and efficient eyewear frame assembly having a minimal amount of material that meets the impact resistance requirements needed for safe use during sporting activities.

Another object of the present invention is to provide an eyewear frame assembly that allows for easy insertion and removal of lenses while still providing the impact resistance required for use during sporting activities.

The foregoing objects are basically attained by providing an eyewear frame assembly having an aperture for receiving a lens, the frame having a split to expand upper and lower portions of the frame to insert or remove the lens from the aperture, first and second projections extending outwardly from the upper and lower frame portions, respectively, the first and second projections having first and second tapered portions, respectively, a sleeve receiving the first and second projections, the sleeve having first and second inwardly extending tapered tabs adapted to receive the first and second tapered portions to secure the first and second projections within the sleeve, the upper and lower portions of the frame being prevented from expanding when the first and second projections are received within the sleeve, first and second openings in the sleeve for providing access to depress the first and second projections to remove the first and second projections from the sleeve; a bushing coupled to one of the upper and lower portions and having a threaded passageway therein; and a fastener coupled to the other of the upper and lower portions and having a threaded section threadedly engaged with the threaded passageway to prevent the upper and lower portions from moving away from one another, the bushing and the fastener being located inside the sleeve.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring now to the drawings that form a part of the original disclosure:

FIG. 8 is an assembled rear elevational view of the eyewear frame assembly of FIG. 7 with the fastener and bushing being threadedly connected;

FIG. 9 is a top plan view of the bushing of FIGS. 7 and 8 showing its rectangular configuration in plan view.

DETAILED DESCRIPTION OF THE INVENTION

Figure 1:
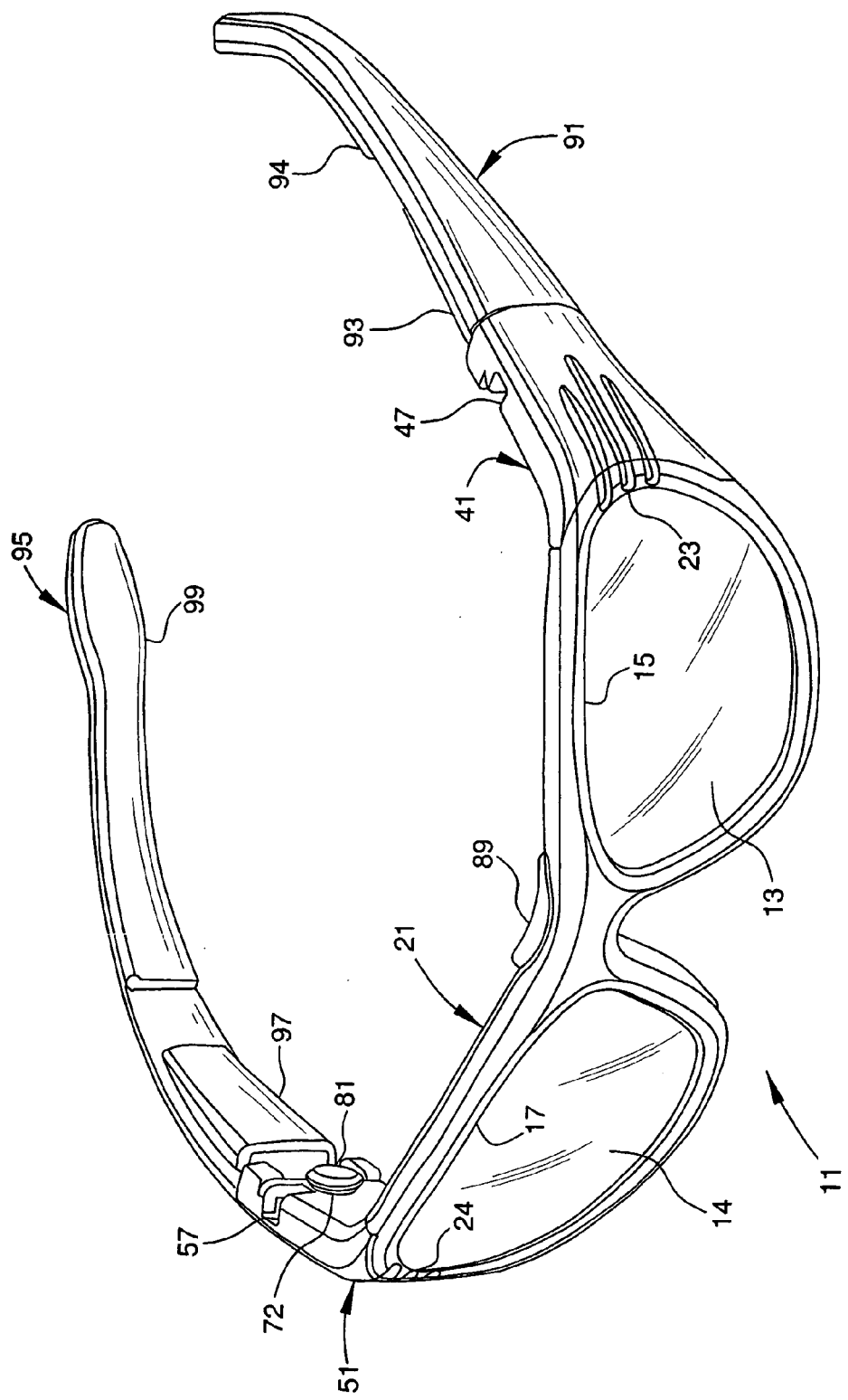
FIG. 1 is a front perspective view of an eyewear frame assembly according to the present invention.

An eyewear frame assembly 11 according to the present invention is shown in FIGS. 1–6. The frame 21 has a split 23 to expand upper and lower portions 25 and 27 of the frame to insert or remove a lens 13 from an aperture 15. First and second projections 31 and 33 extend outwardly from the upper and lower frame portions 25 and 27, respectively. Each of the first and second projections 31 and 33 has first and second tapered portions 32 and 34, respectively. A sleeve 41 receives the first and second projections 31 and 33. The sleeve 41 has first and second inwardly extending tapered tabs 43 and 45 adapted to receive the first and second tapered portions 32 and 34 to secure the first and second projections 31 and 33 within the sleeve. The upper and lower portions 25 and 27 of the frame 21 are prevented from expanding when the first and second projections 31 and 33 are received within the sleeve 41. First and second openings 47 and 49 in the sleeve 41 provide access to depress the first and second projections 31 and 33 to remove the first and second projections from the sleeve 41.

While an eyewear frame assembly 11 having first and second apertures is hereinafter described, the present invention is also applicable to an eyewear frame assembly having a single aperture for receiving a single lens.

Figure 2:
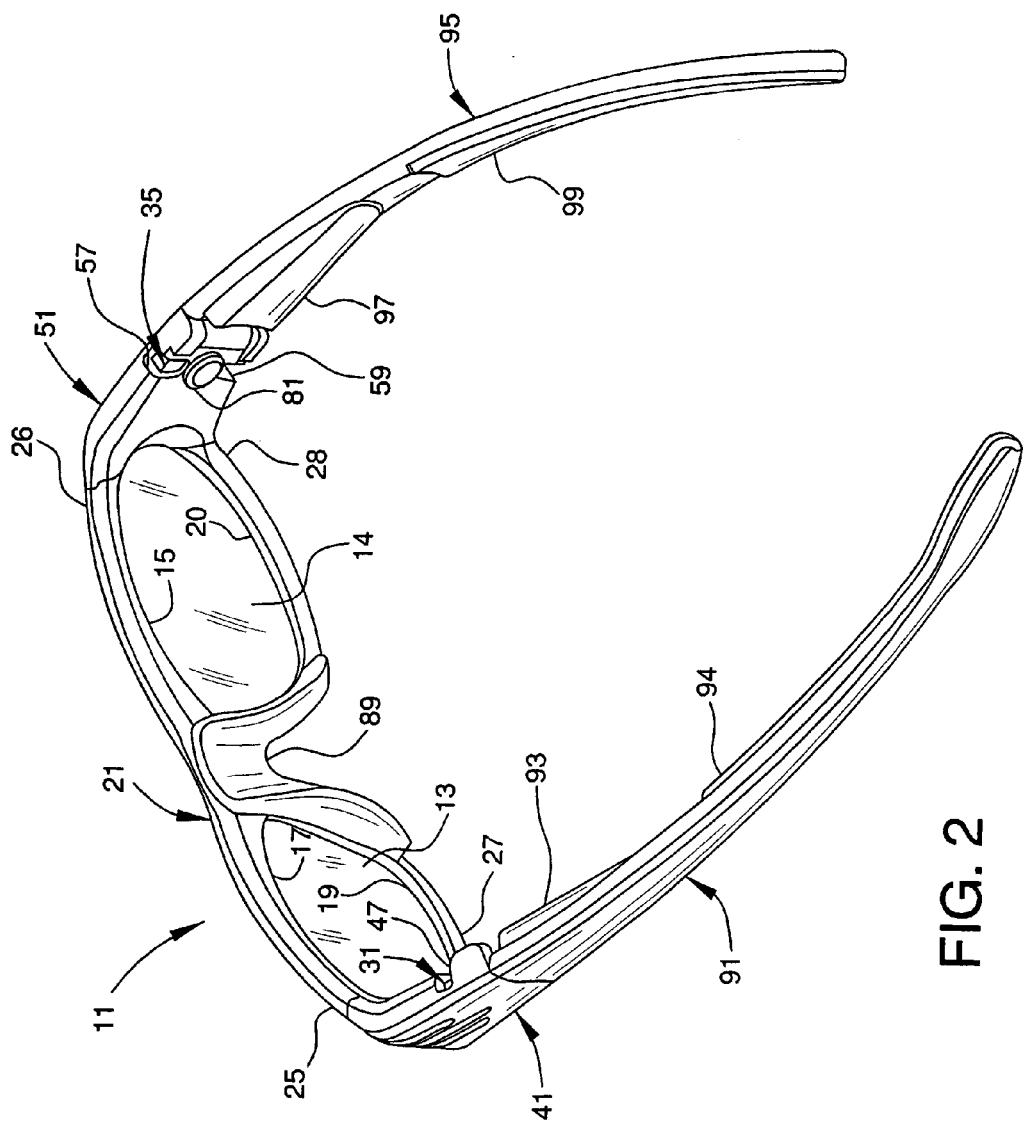
FIG. 2 is a rear perspective view of the eyewear frame assembly of FIG. 1.
Figure 4:
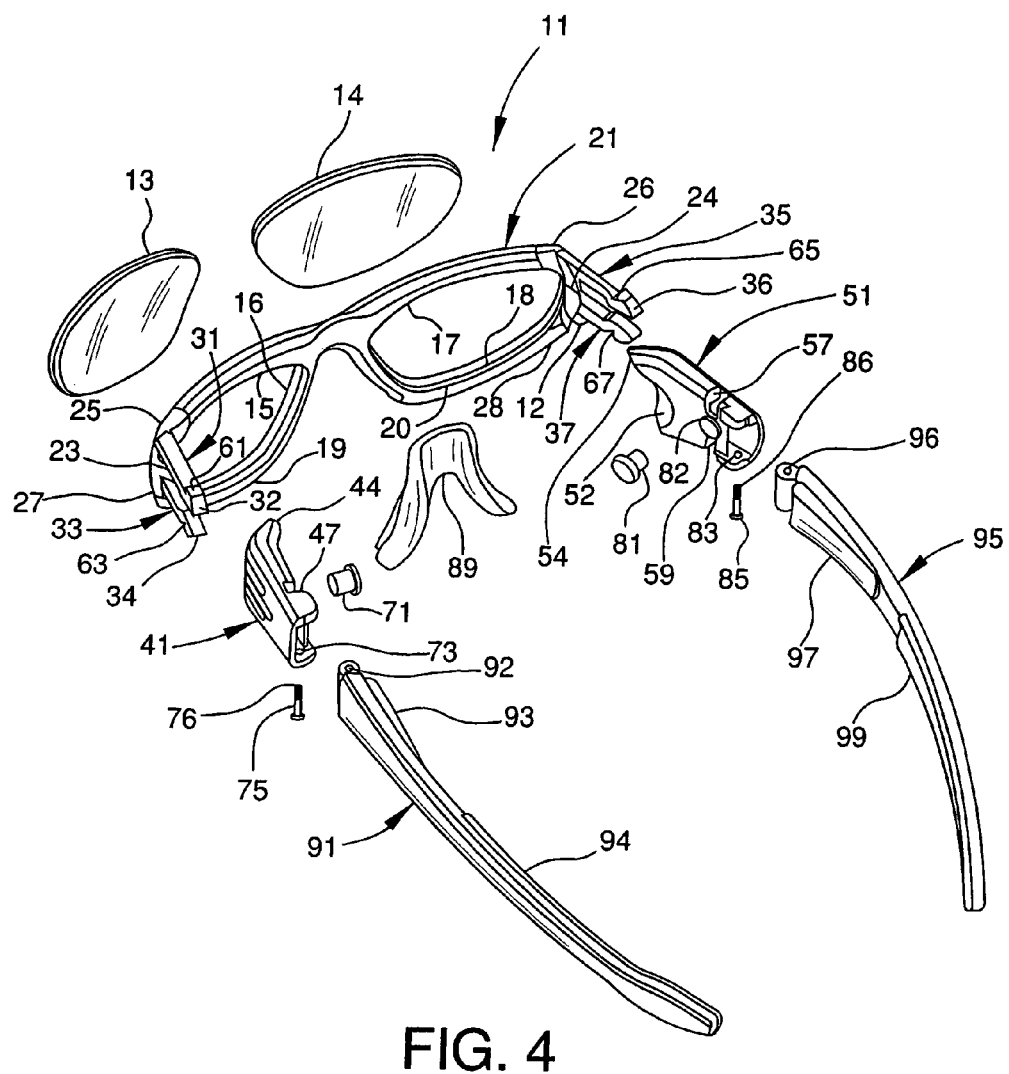
FIG. 4 is an exploded perspective view of the eyewear frame assembly of FIG. 1.

The frame 21, as shown in FIGS. 1, 2 and 4, has first and second apertures 15 and 17 for receiving first and second lenses 13 and 14. A first split 23 in the frame 21 separates the frame into first upper and first lower portions 25 and 27, respectively. The first split 23 allows the first upper and first lower portions 25 and 27 to be expanded so that a first lens 13 may be inserted in the first aperture 15. The frame 21 has first and second grooves 16 and 18 around the first and second apertures 15 and 17 for receiving and securing the lenses 13 and 14 within the frame. First and second rear walls 19 and 20 of the first and second grooves 16 and 18 facilitate lens retention and prevent inserted lenses from being forced through the rear of the frame 21 by an impact to the lens. Fifth and sixth tabs 22 and 12 extend outwardly from the first and second lower portions 27 and 28, respectively. The fifth and sixth tabs may also be located on the frame or an inner surface of the first and second sleeves. A nose pad 89 may be attached to the frame to provide a more comfortable fit for the wearer.

A second split 24 in the frame 21 separates the frame into second upper and second lower portions 26 and 28, respectively, as shown in FIGS. 1, 2 and 4. The second split 24 allows the second upper and second lower portions 26 and 28 to be expanded so that a second lens 14 may be inserted in the second aperture 17.

Figure 5:
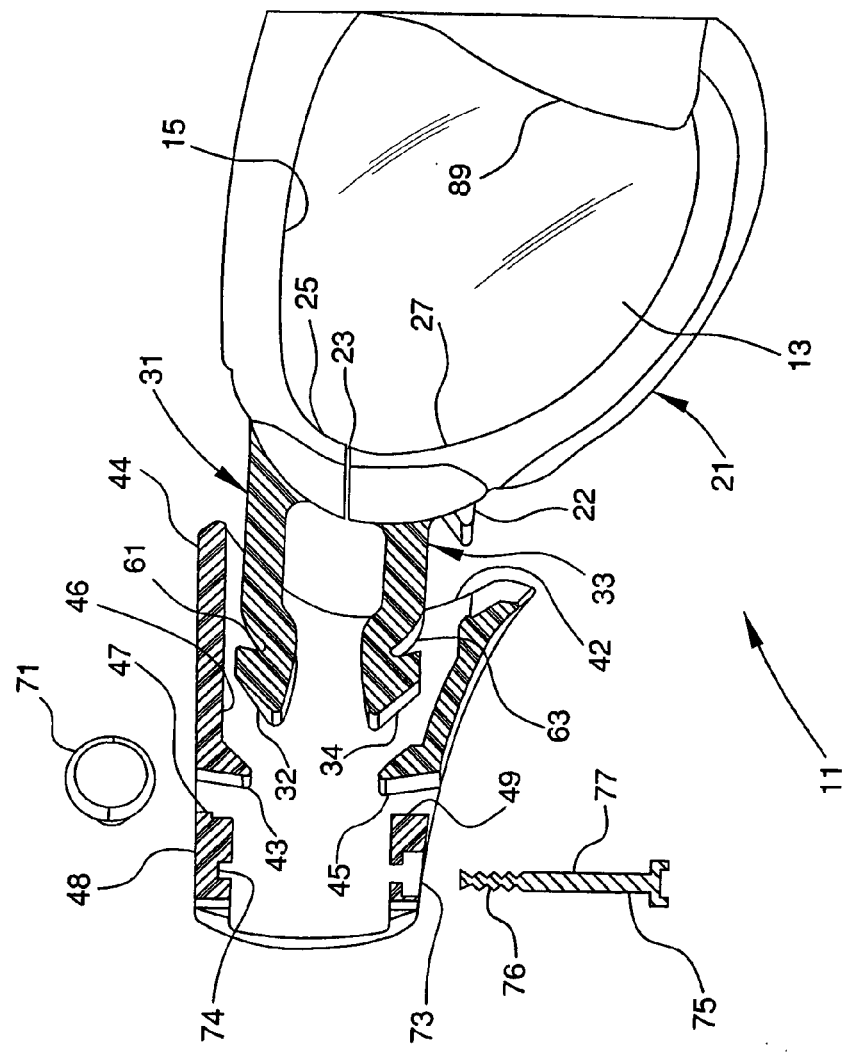
FIG. 5 is an exploded rear elevational view of the eyewear frame assembly of FIG. 1 showing a sleeve in partial cross-section.
Figure 6:
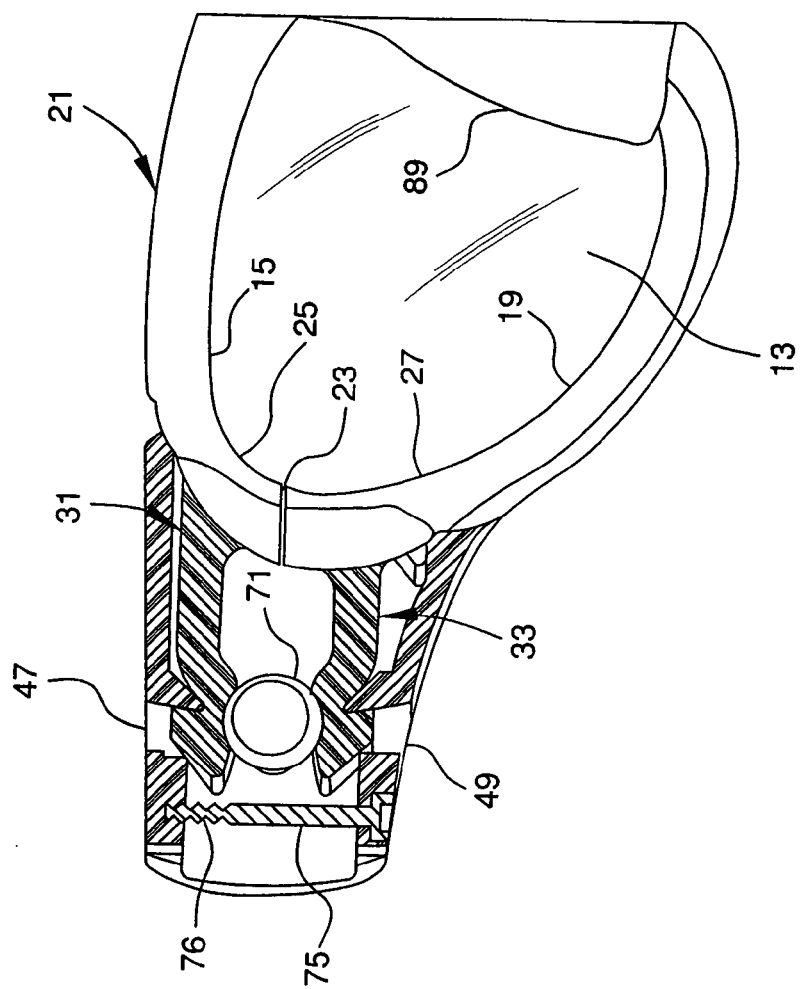
FIG. 6 is an assembled rear elevational view of the eyewear frame assembly of FIG. 5.

A first projection 31 extends outwardly on the first upper portion 25 of the frame 21, as shown in FIGS. 4, 5 and 6. A second projection 33 extends outwardly on the first lower portion 27 of the frame 21. The first projection 31 has a first tapered portion 32 and the second projection 33 has a second tapered portion 34. The first projection 31 has a first recess 61 and the second projection 33 has a second recess 63.

A third projection 35 extends outwardly on the second upper portion 26 of the frame 21, as shown in FIG. 4. A fourth projection 37 extends outwardly on the second lower portion 28 of the frame 21. The third projection 35 has a third tapered portion 36 and the fourth projection 37 has a fourth tapered portion 38. The third projection 35 has a third recess 65 and the fourth projection 37 has a fourth recess 67.

Figure 3:
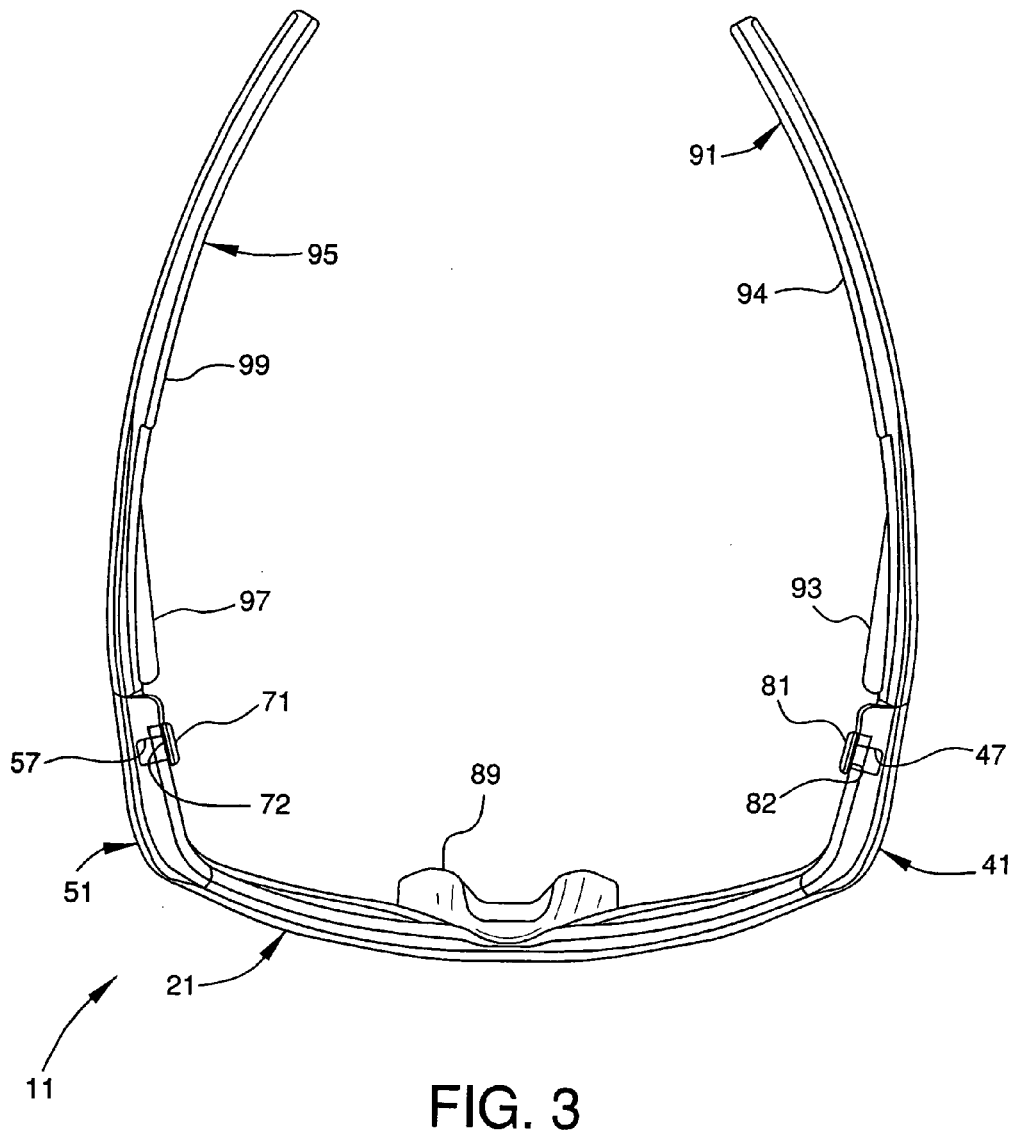
FIG. 3 is a top plan view of the eyewear frame assembly of FIG. 1.

A first sleeve 41 receives the first and second projections 31 and 33 through an opening 42 in a first end 44 of the sleeve, as shown in FIGS. 5 and 6. First and second inwardly extending tapered tabs 43 and 45 extend from an inner surface 46 of the first sleeve 41 to engage first and second recesses 61 and 63 of first and second projections 31 and 33 to facilitate retention of the first and second projections within the first sleeve. First and second openings 47 and 49 in the first sleeve provide access to the first and second projections 31 and 33 to remove the first and second projections from the first sleeve 41. A first pin 71 is received by a third opening 72 in the first sleeve 41, as shown in FIG. 3. The first pin 71 prevents the first and second projections 31 and 33 from being depressed and removed from the first sleeve 41. A first fastener hole 73 in the outer surface 48 of the first sleeve receives a first fastener 75. A second fastener hole 74 on the opposing inner surface 46 of the first sleeve threadably receives the threaded portion 76 of the first fastener. The remaining shank portion 77 is bare for pivotally connecting the first temple arm 91 to the first sleeve 41.

A second sleeve 51 receives the third and fourth projections 35 and 37 through an opening 52 in a first end 54 of the sleeve, as shown in FIG. 4. Third and fourth inwardly extending tapered tabs (not shown) extend from an inner surface of the second sleeve and are identical to the first and second tabs 43 and 45. Third and fourth tabs engage third and fourth recesses 65 and 67 to facilitate retention of third and fourth projections 35 and 37 within the second sleeve 51. Fourth and fifth openings 57 and 59 in the second sleeve 51 provide access to the third and fourth projections 35 and 37 to remove the third and fourth projections from the second sleeve 51. A second pin 81 is received by a sixth opening 82 in the second sleeve 51, as shown in FIG. 3. The second pin 81 prevents the third and fourth projections 35 and 37 from being depressed and removed from the second sleeve 51. A third fastener hole 83 in the outer surface 58 of the second sleeve 51 receives a second fastener 85. A fourth fastener hole 84 on the opposing inner surface 56 of the second sleeve 51 threadably receives the threaded portion 86 of the second fastener 85. The remaining shank portion 87 is bare for pivotally connecting the second temple arm 95 to the second sleeve 51.

First temple arm 91 has a first passageway 92 therethrough that receives the first fastener 75 to pivotally connect the first temple arm to the first sleeve 41, as shown in FIG. 4. First and second temple pads 93 and 94 may be attached to the first temple arm to provide a more comfortable fit for the wearer. The first fastener 75 is received by the first fastener hole 73 and the first passageway 92 in the first temple arm 91, before the threaded portion 76 of the first fastener is threadably received by the second fastener hole 74 to secure the first temple arm to the first sleeve 41.

Second temple arm 95 has a second passageway 96 therethrough that receives the second fastener 85 to pivotally connect the second temple arm to the second sleeve 51, as shown in FIG. 4. Third and fourth temple pads 97 and 99 may be attached to the second temple arm 95 to provide a more comfortable fit for the wearer. The second fastener 85 is received by the third fastener hole 83 and the second passageway 96 in the second temple arm 95, before the threaded portion 86 of the second fastener is threadably received by the fourth fastener hole (not shown) to secure the second temple arm to the second sleeve 51.

Preferably, the frame 21 and first and second sleeves 41 and 51 are made of plastic. More preferably, the frame 21 and first and second sleeves 41 and 51 are made of nylon or other similar strength material.

Assembly and Disassembly of First Embodiment of FIGS. 1–6

A fully assembled eyewear frame assembly 11 is shown in FIGS. 1–3. The eyewear frame assembly 11 is assembled by connecting the various components shown in FIGS. 4 and 5.

The first upper and lower portions of the frame 25 and 27 are pulled apart at the first split 23 so that a first lens 13 may be inserted in the first groove 16. Once the lens is inserted, the resiliency of the frame pulls the first upper and lower portions 25 and 27 back together. First and second projections 31 and 33 are then inserted into the opening 42 at the first end 44 of the first sleeve 41, as shown in FIG. 5. The first and second tapered portions 32 and 34 contact the first and second inwardly extending tapered tabs 43 and 45, which force the first and second projections inwardly toward one another as they pass the tapered tabs. Once the first and second projections 31 and 33 pass the tapered tabs, the resiliency of the projections causes them to move away from one another and return to their original position. The tapered tabs 43 and 45 are then received by the first and second recesses 61 and 63 in the first and second projections 31 and 33, which prevent the first and second projections from being accidentally disengaged and pulled back through the first sleeve 41. Moreover, pressure of the inner surface 46 of the first sleeve 41 on fifth tab 22 facilitates bringing the first upper and lower portions 25 and 27 of the frame 21 together.

As shown in FIGS. 3 and 6, a first pin 71 is inserted through the third opening 72 in the first sleeve so that it is positioned between the first and second projections 31 and 33. With the first pin 71 in this position, the first and second projections 31 and 33 are prevented from being moved together so that the first and second projections cannot be removed from the first sleeve 41, thereby locking the first sleeve 41 on the frame 21.

First fastener 75 is inserted through first fastener hole 73 in the outer surface 48 of the first sleeve 41 and through the aligned passageway 92 in the first temple arm, as shown in FIGS. 5 and 6, to secure the first temple arm 91 to the first sleeve. The threaded portion 76 of the first fastener threadably engages the second fastener hole 74 on the inner surface 46 of the first sleeve 41. The remaining portion of the first fastener 75 is bare, thereby allowing the first temple arm 91 to pivot with respect to the first sleeve 41.

To remove the first and second projections 31 and 33 from the first sleeve 41, the first pin 71 is removed from the third opening 72 in the first sleeve. The first and second projections 31 and 33 are then depressed through first and second openings 47 and 49 in the outer surface 46 of the first sleeve 41, such as with pliers. By depressing the first and second projections, the first and second projections may be disengaged from the first and second inwardly extending tapered tabs 43 and 45 and pulled out through the first opening 42 in the first sleeve. The first and second upper portions 25 and 27 may then be pulled apart at the first split 23 to change the first lens 13 as desired.

The same process applies to the assembly and disassembly of the third and fourth projections 35 and 37 with the second sleeve 51 and second temple arm 99.

Figure 7:
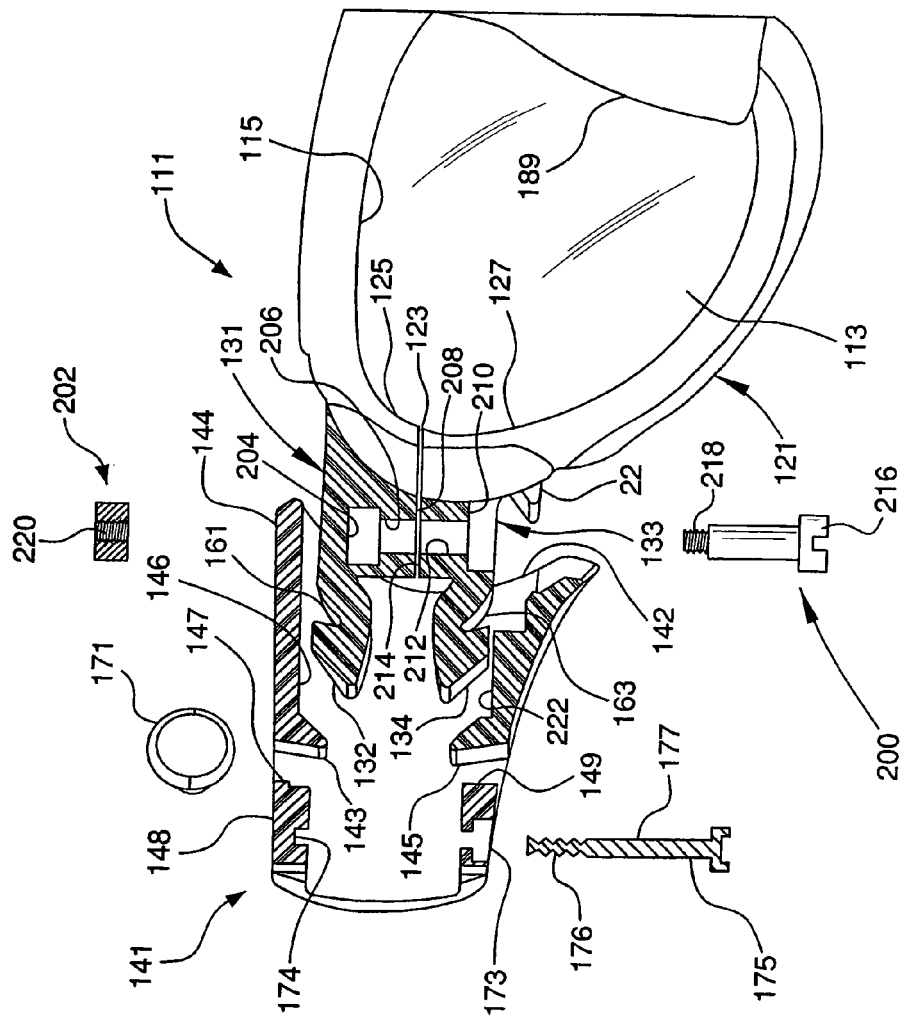
FIG. 7 is an exploded rear elevational view of a second embodiment of the eyewear frame assembly showing a sleeve in partial cross-section and the addition of a threaded fastener and a threaded bushing reinforcement assembly.

Second Embodiment of FIGS. 7–9

A second embodiment of the present invention is shown in FIGS. 7–9 as eyewear frame assembly 111. This second embodiment is substantially the same as the first embodiment of FIGS. 1–6 and like reference numerals are used in FIGS. 7–9 with the addition of 100 thereto to refer to similar elements as in the first embodiment. The second embodiment is modified by the addition of a threaded fastener 200 and a threaded bushing 202, as well as related structure, received inside the sleeve 141 to form a reinforcement assembly for the upper and lower portions 125 and 127 and the first and second projections 131 and 133 of the split frame 121. This reinforcement assembly advantageously helps to keep the split frame portions 125 and 127 and projections 131 and 133 located thereon together during various vigorous activities, in addition to the sleeve 141, so that the lenses, such as lens 113, do not easily fall out of the frame.

More specifically, as seen in FIGS. 7–9, the upper portion 125 first projection 131 is modified by extending its vertical thickness and forming a substantially parallelopiped-shaped cavity 204 therein with a substantially cylindrical passageway 206 extending downwardly therefrom and ending at the substantially planar bottom edge 208 of the projection 131. Cavity 204 advantageously is formed as a transverse through-opening in the projection 131 so that bushing 202 can be slided into the cavity from outside the upper portion 125.

In addition, the lower portion 127 second projection 133 is modified by extending its vertical thickness and forming a substantially parallelopiped-shaped cavity 210 on its bottom edge with a substantially cylindrical passageway 212 extending upwardly therefrom, in alignment with passageway 206, and ending at the substantially planar top edge 214 of the second projection 133.

The threaded fastener 200 has a head 216 at one end engageable with a screwdriver, or other suitable rotary tool, and an externally threaded section 218 at the other end. The threaded fastener is advantageously made of metal, such as nickel-silver alloys, nickel-copper alloys or stainless steel, or other suitable material that retains thread strength, and has a size and configuration to be received in passageways 206 and 212, as seen in FIG. 8, to reinforce and rigidly couple portions 125 and 127 and projections 131 and 133 together. Head 216 is larger than the diameter of passageway 212 to engage projection 133.

As seen in FIGS. 7–9, threaded bushing 202 is also advantageously made of metal and has an exterior with a substantially parallelepiped-shaped configuration and fits or is embedded in cavity 204 so that there is little or no relative vertical or rotational movement between the bushing 202 and the cavity 204, i.e., the cavity 204 has a size and configuration that is substantially the same but slightly larger than the bushing 202. As seen in FIG. 8, the bushing 202 is surrounded by and advantageously is engaged by the four walls forming the cavity 204. The bushing 202 has a substantially centrally located, internal bore or passageway 220 that is threaded and can threadedly receive the externally threaded section 218 of the threaded fastener 200, as seen in FIG. 8.

In addition, sleeve 141 is slightly modified to provide an upwardly extending rib 222 with a substantially planar surface on the inside of the sleeve adjacent the bottom as seen in FIGS. 7 and 8. As seen best in FIG. 8, once the sleeve 141 is fully installed, rib 222 substantially engages and is substantially flush with head 216 of the fastener 200. This helps prevent the fastener 200 from rotating in the unlocking direction, i.e., backing out, and helps prevent the fastener 200 from releasing its threaded connection with the bushing 202.

Assembly of the Second Embodiment of FIGS. 7–9

The eyewear frame assembly 111 forming the second embodiment of the invention is assembled in a manner similar to that disclosed above regarding the first embodiment of FIGS. 1–6 with the addition of the use of the threaded fastener 200 and the threaded bushing 202 on each side of the frame assembly 111.

Thus, before the sleeve 141, as seen in FIGS. 7 and 8, is installed, the threaded fastener 200 is maneuvered into passageways 212 and 206, and the threaded bushing 202 is placed inside cavity 204. Then threaded section 218 is threadedly engaged with threaded bore 220, and the threaded fastener 200 is rotated so that the bottom of head 216 engages edge 210 of lower portion 127, thereby tending to pull the upper and lower portions 125 and 127, and projections 131 and 133 together, as seen in FIG. 8, to securely retain and grip the lens 113 in the frame assembly and resist its inadvertent removal. Advantageously, as shown in FIG. 8, edges 208 and 214 of the upper and lower portions 125 and 127 first and second projections 131 and 133 do not actually engage, so that there is significant force holding the two portions and projections together via the fastener 200 and bushing 202, as well as sleeve 141.

After the fastener and bushing are engaged, the sleeve 141 is maneuvered into place as seen in FIG. 8 and as essentially described above regarding the embodiment of FIGS. 1–6. As seen in FIG. 8, the fastener 200 and bushing 202 are both received inside sleeve 141, and rib 222 on the sleeve 141 substantially engages head 216 of the fastener which helps to maintain both the fastener and bushing in place.

While advantageous embodiments have been chosen to illustrate the invention, it will be understood by those skilled in the art that various changes and modifications may be made therein without departing from the scope of the invention as defined in the appended claims.

What is claimed is:

1. An eyewear frame assembly, comprising:
a frame having an aperture for receiving a lens, said frame having a split to expand upper and lower portions of said frame to insert or remove the lens from said aperture;
first and second projections extending outwardly from said upper and lower frame portions, respectively, said first and second projections have first and second tapered portions, respectively;
a sleeve for receiving said first and second projections, said sleeve having first and second inwardly extending and tapered tabs adapted to receive said first and second tapered portions to secure said first and second projections within said sleeve, said upper and lower portions of said frame being prevented from expanding when said first and second projections are received within said sleeve;
first and second openings in said sleeve for depressing and removing said first and second projections from said sleeve;
a bushing coupled to one of said upper and lower portions and having a threaded passageway therein; and
a fastener coupled to the other of said upper and lower portions and having a threaded section threadedly engaged with said threaded passageway to prevent said upper and lower portions from moving away from one another,
said bushing and said fastener being located inside said sleeve.

2. A frame assembly according to claim 1, wherein said first and second projections have first and second recesses, respectively, to receive said first and second tabs.

3. A frame assembly according to claim 1, wherein a first pin is positioned between said first and second projections to prevent depressing and removing of said first and second projections.

4. A frame assembly according to claim 3, wherein a third opening in said sleeve receives said first pin.

5. A frame assembly according to claim 1, wherein first and second fastener holes in said sleeve receive a fastener to pivotally connect a temple arm to said sleeve.

6. A frame assembly according to claim 5, wherein a temple pad is attached to said temple arm.

7. A frame assembly according to claim 1, wherein said frame is made of plastic.

8. A frame assembly according to claim 7, wherein said plastic is nylon.

9. A frame assembly according to claim 1, wherein a nose pad is attached to said frame.

10. A frame assembly according to claim 1, wherein a fifth tab extends outwardly from said frame and is received by said sleeve to facilitate securing said first and second projections within said sleeve.

11. A frame assembly according to claim 10, wherein said fifth tab extends outwardly from said lower portion of said frame.

12. A frame assembly according to claim 1, wherein said bushing is received in a cavity in one of said upper and lower portions.

13. A frame assembly according to claim 1, wherein said bushing is formed of metal.

14. A frame assembly according to claim 13, wherein said fastener is formed of metal.

15. A frame assembly according to claim 1, wherein said sleeve engages said fastener to resist said fastener from disengaging said bushing.

16. An eyewear frame assembly, comprising:
a frame having first and second apertures for receiving first and second lenses, said frame having first and second splits to expand first and second upper and first and second lower portions of said frame to insert or remove the first and second lenses from said first and second apertures, respectively;
first and second projections extending outwardly from said first upper and first lower frame portions, respectively, said first and second projections have first and second tapered portions, respectively;
third and fourth projections extending outwardly from said second upper and second lower frame portions, respectively, said third and fourth projections have third and fourth tapered portions, respectively;
a first sleeve for receiving said first and second projections, said first sleeve having first and second inwardly extending and tapered tabs adapted to receive said first and second tapered portions to secure said first and second projections within said first sleeve, said first upper and first lower portions of said frame being prevented from expanding when said first and second projections are received within said first sleeve;
a second sleeve for receiving said third and fourth projections, said second sleeve having third and fourth inwardly extending and tapered tabs adapted to receive said third and fourth tapered portions to secure said third and fourth projections within said second sleeve, said second upper and second lower portions of said frame being prevented from expanding when said third and fourth projections are received within said second sleeve;

first and second openings in said first sleeve for depressing said first and second projections to remove said first and second projections from said first sleeve; fourth and fifth openings in said second sleeve for depressing said third and fourth projections to remove said third and fourth projections from said second sleeve;

a first bushing coupled to one of said first upper and lower portions and having a first threaded passageway therein; and a first fastener coupled to the other of said first upper and lower portions and having a first threaded section threadedly engaged with said first threaded passageway to prevent said first upper and lower portions from moving away from one another;

said first bushing and said first fastener being located inside said first sleeve.

17. A frame assembly according to claim 16, wherein said first and second projections have first and second recesses, respectively, to receive said first and second tabs; and said third and fourth projections have third and fourth recesses, respectively, to receive said third and fourth tabs.

18. A frame assembly according to claim 16, wherein a first pin is positioned between said first and second projections to prevent depressing and removing said first and second projections; and a second pin is positioned between said third and fourth projections to prevent depressing and removing said third and fourth projections.

19. A frame assembly according to claim 18, wherein a third opening in said first sleeve receives said first pin; and a fourth opening in said second sleeve receives said second pin.

20. A frame assembly according to claim 16, wherein first and second fastener holes in said first sleeve receive a first fastener to pivotally connect a first temple arm to said first sleeve; and third and fourth fastener holes in said second sleeve receive a second fastener to pivotally connect a second temple arm to said second sleeve.

21. A frame assembly according to claim 20, wherein a first temple pad is attached to said first temple arm; and a second temple pad is attached to said second temple arm.

22. A frame assembly according to claim 16, wherein said frame is made of plastic.

23. A frame assembly according to claim 22, wherein said plastic is nylon.

24. A frame assembly according to claim 16, wherein a nose pad is attached to said frame.

25. A frame assembly according to claim 16, wherein a fifth tab extends outwardly from said frame and is received by said first sleeve to facilitate securing said first and second projections within said first sleeve; and a sixth tab extends outwardly from said frame and is received by said second sleeve to facilitate securing said third and fourth projections within said second sleeve.

26. A frame assembly according to claim 25, wherein said fifth tab extends outwardly from said first lower portion of said frame; and said sixth tab extends outwardly from said second lower portion of said frame.

27. A frame assembly according to claim 16, wherein said first bushing is received in a cavity in one of said first upper and lower portions.

28. A frame assembly according to claim 16, wherein said bushing is formed of metal.

29. A frame assembly according to claim 28, wherein said fastener is formed of metal.

30. A frame assembly according to claim 16, wherein said first sleeve engages said first fastener to resist said fastener from disengaging said bushing.

31. An eyewear frame assembly comprising:
a frame having an aperture for receiving a lens, said frame having upper and lower portions first and second tapered projections extending outwardly from said frame;

a sleeve for receiving said first and second projections, said sleeve having first and second tapered tabs on an inner surface adapted to receive said first and second tapered projections to secure said first and second projections within said sleeve, said upper and lower portions of said frame being prevented from expanding when said first and second projections are received within said sleeve;

a bushing coupled to one of said upper and lower portions and having a threaded passageway therein; and a fastener coupled to the other of said upper and lower portions and having a threaded section threadedly engaged with said threaded passageway to prevent said upper and lower portions from moving away from one another, said bushing and said fastener being located inside said sleeve.

32. A frame assembly according to claim 31, wherein said frame has a first opening and said sleeve has a second opening aligned with said first opening to receive a pin to secure said sleeve to said frame.

33. A frame assembly according to claim 31, wherein said sleeve engages said fastener to resist said fastener from disengaging said bushing.

* * * * *